United States Patent [19]

Knirsch et al.

[11] 3,989,131

[45] Nov. 2, 1976

[54] ELECTROTHERMAL PRINTING UNIT

[75] Inventors: Franco Knirsch, Pavone (Turin); Lucio Montanari, Cascinette (Turin); Giorgio Rossi, Banchette (Turin), Italy

[73] Assignee: Ing. C. Olivetti & C., S.p.A., Ivrea (Turin), Italy

[22] Filed: Feb. 4, 1975

[21] Appl. No.: 547,077

[30] Foreign Application Priority Data

| | | |
|---|---|---|
| Feb. 18, 1974 | Italy | 67466/74 |
| Jan. 20, 1975 | Italy | 67111/75 |

[52] U.S. Cl. .......... 197/1 R; 197/172; 346/76 R; 219/216

[51] Int. Cl.$^2$ .......... B41J 31/02; G01D 15/10; H05B 1/00

[58] Field of Search .......... 346/76 R; 219/216; 197/1 R

[56] References Cited

UNITED STATES PATENTS

| | | | |
|---|---|---|---|
| 3,777,116 | 12/1973 | Brescia et al. | 346/76 R UX |
| 3,855,448 | 12/1974 | Hanagata et al. | 346/76 R X |
| 3,857,470 | 12/1974 | Bastard et al. | 197/1 R |
| 3,862,394 | 1/1975 | Lane | 346/76 R X |

*Primary Examiner*—George H. Miller, Jr.
*Attorney, Agent, or Firm*—I. J. Schaefer

[57] ABSTRACT

An electrothermic printing unit for writing dot matrix characters on a printing line of a recording medium by means of an electrothermal printing head which is continuously movable along the printing line during the printing operation and having a column of resistive printing elements therein disposed transverse to the printing line and selectively electrically heatable in timed relation with the movement of the head characterized in that a thermosensitive inking element having a support of heat permeable material covered by a coating of material transferable for the combined action of head and pressure is interposed between the head and the recording medium, pressure means being provided for pressing said printing elements against said support and said coating against said recording medium during the movement of the head.

9 Claims, 6 Drawing Figures

ELECTROTHERMAL PRINTING UNIT

The present invention refers to an electrothermal printing unit for the non-impact printing of dots-matrix characters on a display medium.

Two thermal printheads are described in the U.S. Pat. No. 3,777,116 and in the U.S. application for patent, Ser. No. 512,564 in the name of the Applicants. These printheads have a single column of heating elements selectively energized. In both cases, the print head is positioned with the column of printing elements extending along the height of the characters to be printed and transversely to the printing line of the display.

Each of these heating elements is able to print all the dots of a row of dots of the format matrix of the character to be printed, the height of each of the afore-mentioned heating elements being that of the printed dot, that is to be obtained on the display medium, while the width of each of the said heating elements is much less than that of the dot printed. This allows the printhead to be moved continuously along the printing line, the dot printed being the result of the combined action of the heating of the heating elements and of the movement of the printhead.

In this way, each of the characters of the printing line is written with a number of elementary acts of printing, during each of which one or more of the heating elements are energized, equal to the number of columns of the format matrix of the characters.

As has already been described in the above-mentioned patents and patent application, this method of writing offers a large number of advantages over the system where the printhead includes as many heating elements as there are dots of the matrix and is stationary with respect to the display medium during the writing operation of each character while moves forward by one step to a new position after each printing operation. It makes it possible to use mechanical devices which control the continuous forward movement of the printhead instead of an intermittent movement; it also makes it possible to adapt the size of the electric driving circuit for a number of heating elements equal to the number of dots of a column of the matrix instead of to the whole number of dots of the matrix with obvious reduction in cost. These advantages are further enhanced if, using the same method, it is possible to print on normal or plain paper which is considerably cheaper than heat sensitive paper.

The obvious solution of inserting a heat transferring ribbon of a well-known type between the printhead and the display support proved to be unsatisfactory from the point of view of the quality of the printing. Usually, these ribbons include a backing on which there is a layer of display material which softens when heated and which when brought into contact with the display medium adheres to this, leaving a deposit and thus a visible sign of the recording.

Normally, the main action for the transfer is the heating of that part of the layer which is to be transferred, while slight pressure is enough to make the softened coating stick to the display medium.

However these ribbons have a tendency to transfer the coating even at a lower temperature that at which they normally soften if sufficient pressure is exerted against the paper.

If this method of functioning is acceptable in those printers in which the printhead is stationary and in contact with the ribbon during the energizing of the heating elements while the printhead is detached from the ribbon for the movement forward to a new positon, this position, is not viable when the printhead slides in contact with the back of the ribbon during the energizing of the heating elements. In fact, in this last case, the time for which each part of the layer to be transferred should be in contact with the heating element and the paper is reduced because of the movement of the printhead, and the pressure must be increased accordingly in order to ensure that the coating is transferred effectively onto the paper; if the ribbon presents the above-mentioned drawback, then the uniform pressure exerted by the printhead may cause the transfer of the coating at points where this is not required; this shows up on the recording medium as black streaks or areas of display where the quality is uneven, i.e. the quality of the recording is not so good as that of the printed characters but such that it spoils the quality of the printing.

Therefore, one of the most important aims of the present invention is to produce an electro-thermal printing unit for printing alphanumeric characters in dot matrices on a display medium preferably normal paper using a heat sensitive ribbon inserted between the electronic thermal printhead, which moves continuously along the printing line during the writing operation, and the display support itself.

A further aim of this inventon is to produce a ribbon which is sensitive to heat for the transfer of the coating onto the support and which does not involve the drawbacks mentioned above.

The present invention has achieved these aims, it is characterized by the fact that a heat sensitive inking element is interposed between the display support and the printhead; this element consists of a support on which there is a coating of material on the side facing the paper; this material is transferable through the combined effect of heat and pressure, that devices are foreseen for the continuous moving of the above-mentioned printhead along the line of print and for exerting pressure on the printhead in order to keep its heading elements in contact with the above-mentioned inking element: the selective energizing of said heating element, carried out synchronously with the movement of the printhead, causes portions of the above-mentioned coating to be transferred to the display medium in a position corresponding to the areas heated by the above-mentioned element.

This and other aims, characteristics and advantages of the present invention will be clearly illustrated in the description given below, which is however given merely as an example and is not limited thereto, with regard to the attached drawings in which.

Figure 1:
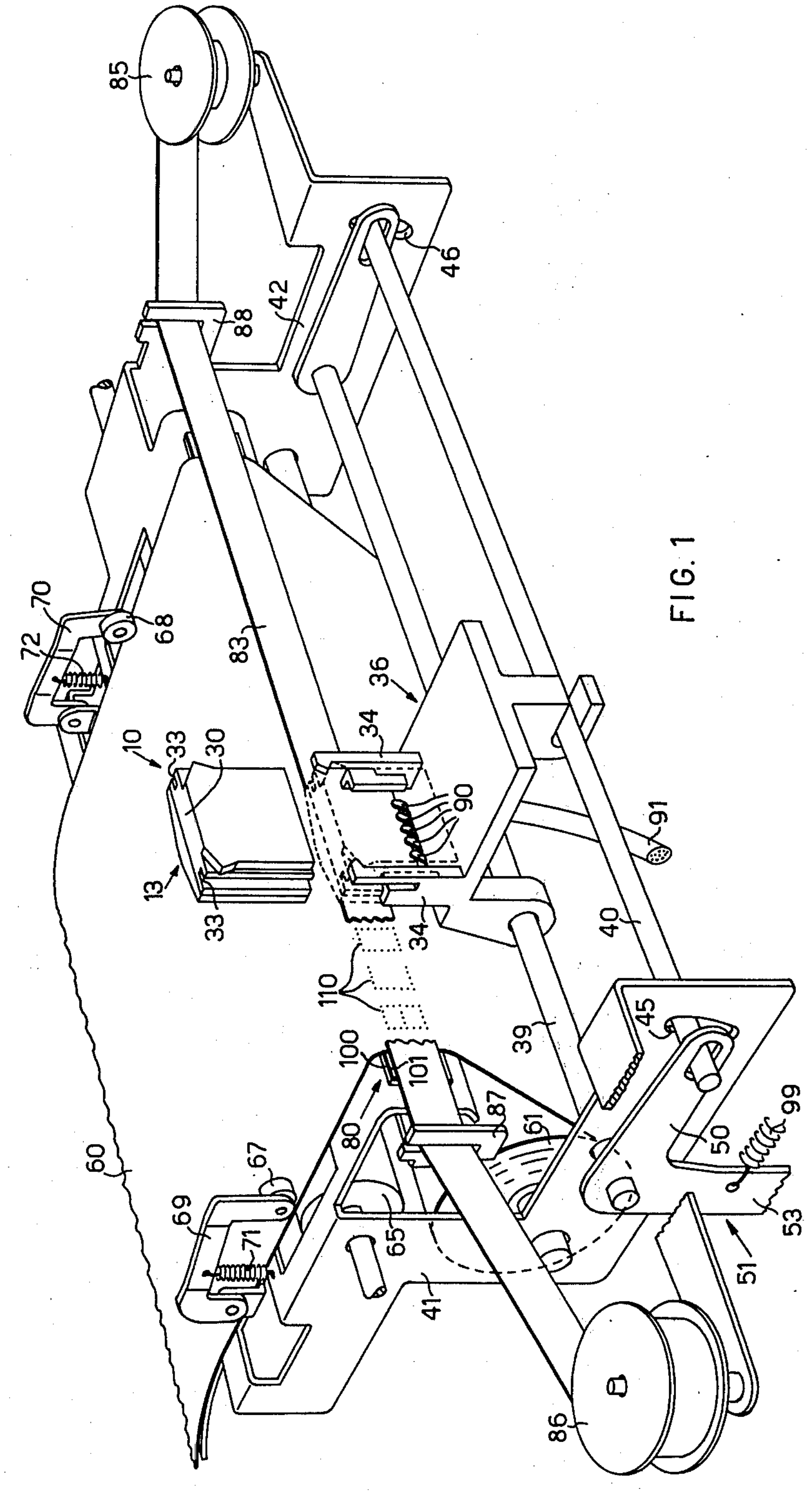
FIG. 1 is an enlarged view of an electro-thermal printing unit according to the invention.
Figure 5:
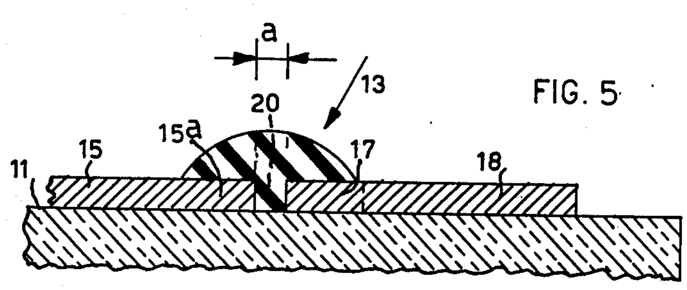
FIG. 5 is a section according to V—V of FIG. 4.

With reference to FIGS. 1 and 5 a thermal printhead of the type for example described and claimed in various aspects in the copending patent application Ser. No. 512,564 in the name of the Applicants is in general indicated with the number 10.

Printhead 10 includes a support of insulating material 11 in the shape, for example, of a prism having an isosceles trapezoid section with angle $\beta$ included between the smaller base and the oblique side just under 180°.

On the flat surface denoted with the number 12 and corresponding to the smaller base are located N heating elements 13, aligned parallel to the corners of support 11. The number N in the figure is for example equal to seven but this must not be considered as limiting.

Figure 2:
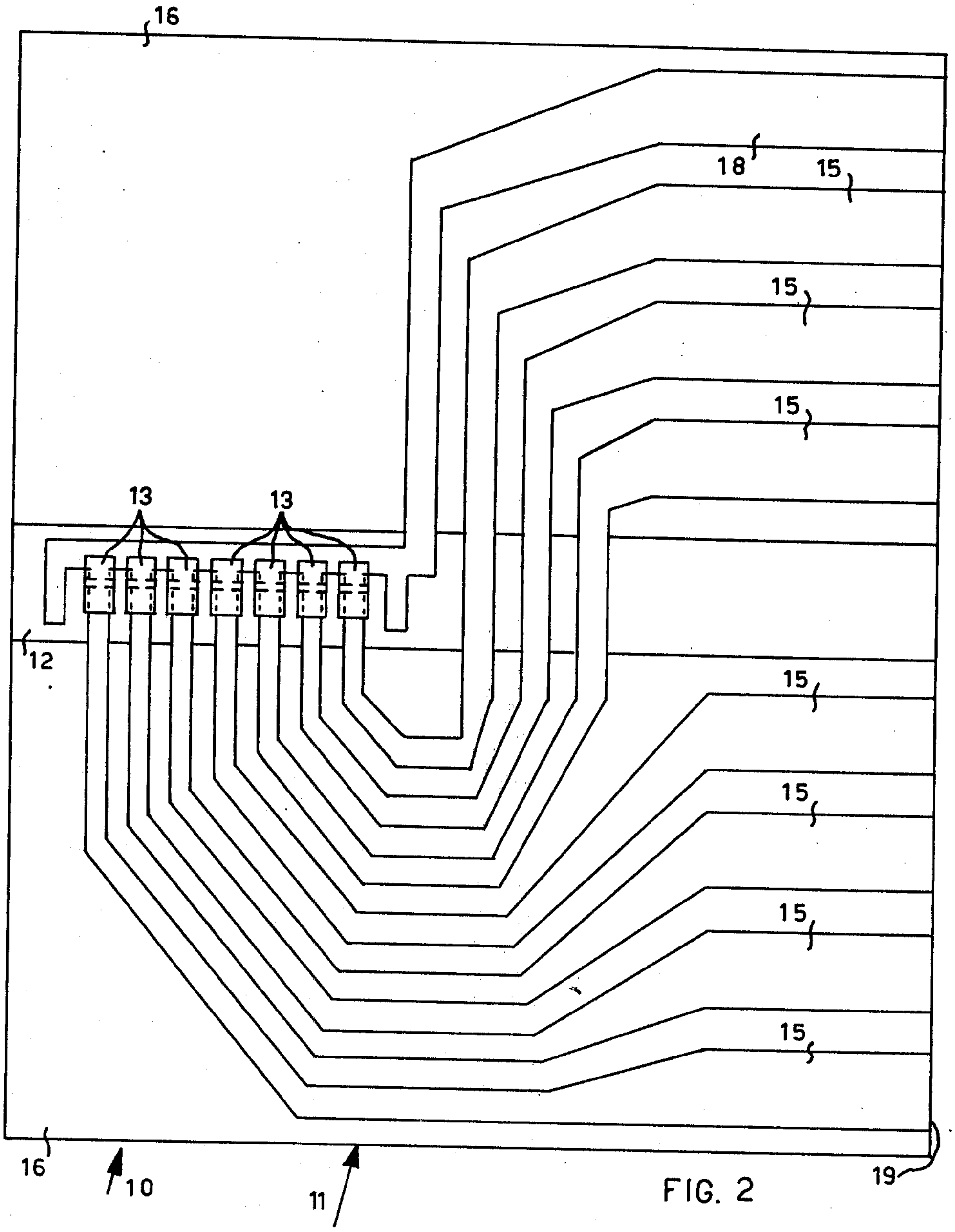
FIG. 2 is a front view of a printhead of an electro-thermal printing unit as illustrated in FIG. 1.

Each of the above-mentioned elements 13 is connected to a supply lead 15 and to a lead 18 which is common to all the heating elements. In FIG. 2, the elements 13 are shown horizontally oriented while the other figures show the elements 13 as vertically oriented.

Leads 15 and 18 go from surface 12 to surfaces 16 and 17 corresponding to the oblique sides until they reach the base 19 of the prism support 11.

Figure 3:
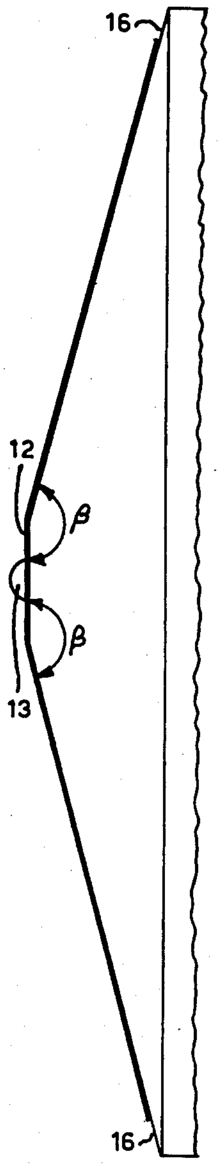
FIG. 3 is a side view of FIG. 2.
Figure 4:
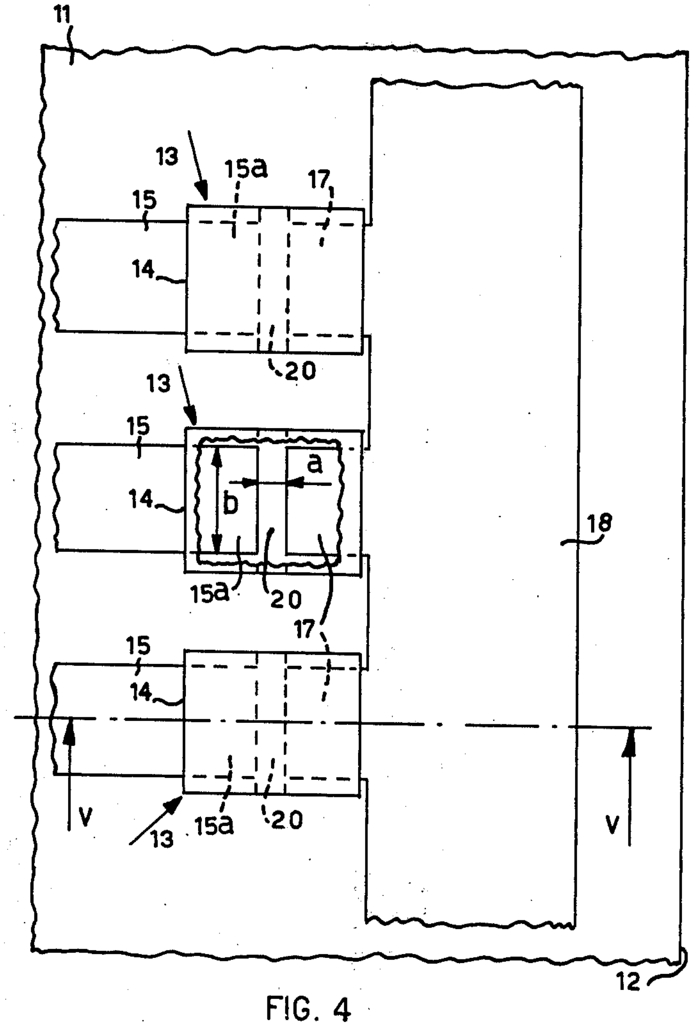
FIG. 4 is an enlarged detail of FIG. 2.

The technique used to obtain the deposition of these heating elements and leads on support 11 may be that of the thick film which is well-known to the art. In this case, conductive layers 15 and 18 are first deposited, according to the configuration of FIG. 3, leaving a gap of some microns (a typical example is 50 $\mu$) between the end 15*a* of leads 15 and the end 17 of lead 18 with the width $\beta$ of the deposit near to the end 21 equal to 150 - 200 $\mu$.

Subsequently, several layers of resistive material are deposited in each area 20 included between the end 15*a* of lead 15 and the return lead 18 until a resistive deposit is obtained whose surface not in contact with the support is curved as illustrated in FIG. 5. The deposits of coating above leads 15 and 18 are completely short-circuited from the underlying conductor deposits.

The only area which is not shorted is that included in the zone 20 which has one base in contact with the support rectangular shaped (size = A × B = 50 $\mu$ × 200 $\mu$) and an outer curved surface. These parts constitute the heating elements 13 of the printhead and each of them is heated through the application of a suitable difference in potential between the corresponding supply lead 15 and the common return lead 18.

FIG. 1 illustrates a printing unit according to the invention with the use of a printhead 10 of the above-mentioned type.

Printhead 10 is bonded to a printhead support 30 which has positioning and guiding elements 33 capable of collaborating with corresponding positioning and guiding elements 34 located on a carriage 36 which moves the printhead along the printing line of the display medium 60.

To do this, the carriage is mounted on rods 39 and 40 connected to the end plates 41 and 42 of the frame of the printer. Guide rod 40 passes through apertures 46 and 45 on the righthand and lefthand end plates respectively and operates in conjunction with arm 50 of a lever 51 fulcrumed and connected to the guide rod 39 and which has a second arm 53.

A spring 99 is stretched between arm 53 and the frame of the printer.

Lever 51 can take up two distinct positions one of which is illustrated in FIG. 1 and the other where the lever is rotated in a clockwise direction in relation to the position illustrated in FIG. 1. In the same manner, guide rod 40 is moved upwards to the top of apertures 45 and 46 or towards the lower part of the apertures 45 and 46 rotating the carriage, which is mounted pivotally on guide rod 39, in a clockwise direction in respect to the position illustrated in FIG. 1.

The display medium 60, which should preferably consist of ordinary paper, is normally fed from a spool 61 rotatably mounted on the end plates 41 and 42 of the frame of the printer. The paper is fed by means of a driving roller 65 which is rotatably mounted on the end plates 41 and 42 and by means of the pressure rollers 67 and 68 which are rotatably mounted on levers 69 and 70 pivotally mounted on end plates 41 and 42 and connected to these using springs 71 and 72 which put pressure on rollers 67 and 68 and cause them to operate together with the drive roller 65.

The drive roller 65 is controlled using a stepping motor of a well-known type which is not illustrated and which controls the vertical spacing of the recording sheet. The display medium 60 is kept in contact along the printing line with a platen 80 including a rigid support 100 mounted on the frame of the printer, covered with a thin layer of non-resistent material 101 which is of the elastic-plastic type, for example, a layer made up of hard rubber overlaid with a coating of plastic material for example, polyvinyl chloride.

Between the carriage assembly with the printhead 10 and the display medium 60 along the platen, is inserted a ribbon 85 consisting of a support bearing a layer of heat transferable material on the side facing the display medium. The ribbon is moved by takeup reel 86 and feed reel 85 which are mounted on the frame of the printer and controlled by motor both in order to guarantee the ribbon is kept taut and to ensure that it is fed correctly.

Two ribbon guides 87 and 88 are utilized, located near end plates 41 and 42 and forming an integral part of these. By inserting the printhead support 30 on carriage assembly 36, the printhead is positioned with the column of heating elements 13 perpendicular to the line of print and in contact with ribbon 83. There are 8 electric contacts on the carriage consisting of flexible laminae leads 90 connected by means of a flexible cable 91 to the circuit for the selection and electric control of the heating elements of a well-known type not illustrated; this enables the electric connection between this circuit itself and leads 15 and 18 of the heating elements 13 of the printhead 10.

During the writing operation, the carriage is moved at a constant speed from left to right, with reference to FIG. 1 using known type of motor not illustrated in FIG. 1.

During this movement, the printhead 10 is kept in contact with the ribbon 83, as lever 51 is in the position shown in FIG. 1 and the spring 99, using lever 51 and guide rod 40, exerts the necessary pressure on the printhead 10. Also during the movement and synchronized with it, the control and selection circuit energizes the heating elements 13 required to write the dots of all the characters of the printing line.

Therefore, at all those points of the ribbon 83 where there is a simultaneous pressure and heating by the heating elements 13, during the passing of the printhead 10, the thermally transferable material of ribbon 83 is transferred onto the display medium and therefore characters 110 are printed. This process is explained in more detail below.

At the end of the run from left to right, and therefore after the writing of a line on the display medium 60, the lever 51 is rotated in a clockwise direction against the action of spring 99 causing guide rod 40 to engage with the lower part of apertures 46 and 45 and the rotation in a clockwise direction of the carriage 36 around guide rod 39 thus causing the printhead to be moved away from the display medium. The carriage then returns from right to left controlled by a well-known type of motor and at the end of its run, lever 53 and the carriage are back in the position illustrated in FIG. 1; in the meantime, the drive roll 65 controlled by the stepping motor has fed the display medium by one line and part of ribbon 83 has been fed from the feed reel 85 to the takeup reel 86 for a distance equal to the line of print; in this way, the machine is ready to print another line of characters.

The structure and composition of the ribbon, the shape of the heating elements and their layout and finally the type of platen condition the transfer of the thermally transferable material to the display medium and thus the quality of the writing.

Ribbon 83 coated with the layer of thermally transferable material used with this system of writing must have extremely restrictive characteristics which cannot be found in ribbon of this type known in the art.

Firstly, the support of the thermally transferable layer must possess extremely good heat conducting qualities and these must be uniform so that the thermal image produced by the selective energizing of the heating elements 13 on the thermally transferable layer is not distorted. Therefore the ribbon support must be as thin as is compatible with the required characteristics of mechanical strength and resistance to warping essential for the feeding and handling of the ribbon, so that it is possible to guarantee the transfer of the thermal image with a minimum loss of clarity and smudging even at high speed.

The need for a low thermal inertia is extremely important as the head 10 is moving along the line of print during the printing operations and thus the time required for the writing of each is strictly fixed and depends on the speed of the printhead; therefore, in order to reach a good speed of printing, the heat produced by the energized heating elements must soften the coating of thermally transferable material in a lower time.

From this point of view, theoretical considerations and experiments have demonstrated that, using the same material, the ribbon support behaves in the same way as an RC transmission line whose equivalent time constant is proportional to the square of its thickness therefore, the writing speed is completely conditioned by this thickness.

The support of the ribbon must also be able to withstand high temperatures, even higher than that at which the coating softens, as the surface in contact with the printhead is subject to even higher temperatures than those at which the coating of thermally transferable material begins to soften.

The coating of inking material must soften above a certain threshold temperature which must be very clear since this helps in the selecting of the transfer and in these circumstances it must stick to the display medium with a degree of adhesion which is equal or higher than that with which it sticks to the support and with contact pressures which are as low as possible.

Below the threshold temperature, the layer of material must not be transferred, even partially, as a result of pressure exerted, so that the streaking and smudging phenomena mentioned above do not occur.

Moreover, the adhesion of the coating which has been softened and then reset on the display medium must be much higher than that of the adhesion to the support ribbon itself so that a complete transfer is obtained when the ribbon and the display medium separate.

With this in mind, the ribbon and the display medium must be kept perfectly still until the layer of material has completely set.

A description will now be given according to one of the objects of the present invention of a ribbon bearing a layer of thermally transferable material which possesses all the above-mentioned qualities.

Various types of plastic material were examined with a view to using them as a support and satisfactory functioning was obtained with thicknesses of 7 – 20 $\mu$. Very good results were obtained with a backing of polyethylenglycole terephthalate sold under the name of "Mylar" and "Hostaphan" (registered trade marks for films of polyethylenglycole terephthalate produced respectively by Du Pont and Hoechsty) or of polyethylene with preferential thicknesses of 7–12 $\mu$.

For the polyethylene backing in particular it was noticed that above these values for the thickness of the layer i.e. for values included in those used for conventional single-use ribbon, the polyethylene backing proved to have a thermal inertia too high to transmit the heat with sufficient intensity and speed to the thermally transferable coating while for lower values, the polyethylene backing warps under the effect of the heating of the heating elements thus interfering with the regular feeding and handling of the tape.

Other plastic substances such as polyvinyl chloride, cellulose estere polyurethane, polycarbonates, polypropylene were also tried but did not give satisfactory results.

As far as the thermally transferable coating is concerned, it was noticed that most of the characteristics required depended not only on the composition but also on the thickness of this layer. In particular, it was seen that with a thickness between 2–4 $\mu$ and with the composition which will be described in detail below, it was not necessary to use an undercoating to improve the adhesive qualities of the coating, as is however necessary for ribbons known to the art, while adhesion thus obtained proves to have the required characteristics; that is to say, when subjected to heating combined with pressure, the adhesion to the backing is reduced and is exceeded by that of the adhesion to the receiving medium even when the latter consists of non-cellulose materials such as polyethylene, wax paper etc. thus making it possible to guarantee a clear transfer of the entire portion of the coating that has been heated.

Moreover, with the above-mentioned range of thicknesses, it is possible to avoid the transfer of parts of the coating adjacent to the part that has been heated.

The composition of the thermally transferable coating is made up of three essential elements: pigments and/or dyes, binder and plastifier.

The job of the pigments and/or dyes is to colour the composition to the colour required. It can be any of the pigments and/or dyes normally used in inking.

The job of the binder is to bind the various components together, in particular the particles of pigment. It plays an important part in the thermal reaction of the coating and in its transfer to the display medium. It consists of thermoplastic resins which are stable in time and its main function is to establish the softening point of the coating. The plastifier is there to guarantee the adhesion of the backing, ensuring that the coating will not crack during the handling of the tape (i.e. the feeding, rewinding and replacement of the tape).

In the formulation of the inking coating, it is preferable to use the binders listed below in order of importance as these can be used conveniently in the producing of the thermally transferable layers; styrene resins and/or terpene resins and epox resins on their own or mixed together; ketonic resins are also suitable, ethers of colophony, non-drying alkyd resins.

It was seen that the best results were obtained with a pigment-binder ratio in weight of ¼ – 1:8.

As essential plastifiers which must always be used together with the above-mentioned resins, some waxes and high-melting compounds were found to be suitable and they helped to optimize the characteristics of plasticity and adherence of the compounds containing the preferential binders indicated. In this way, for example, the high-melting compounds based on hydrocarbonic waxes and thermoplastic resins react favourably in the presence of the preferential styrene and terpene resins and also in the presence of the epox resins which may also be used.

As far as styrene resins are concerned, the most suitable were found to be those sold under the name of Piccolastic D-75, D-100, E-100 AL (Registered Trade Mark for styrene resins produced by the Pennsylvania Industrial Company). A wide range of thermoplastic resins are sold under this name which are stable in time with well-defined softening points which differ according to the type of resin so that there is a good margin of choice for the suitable combination of the other components of the thermally transferable layer according to the use which will be made of the ribbon. In particular, it is possible to raise or lower the softening point of the coating according to need or to the service temperatures of the printhead.

Moreover, the varying degree of plasticity of the compounds of the different series makes it possible to obtain the best formulation in order to avoid any cracking of the inking layer as a result of its being too fragile.

As far as terpene resins are concerned, the most suitable were found to be those sold under the name of Piccolyte (Registered Trade Mark of the Pennsylvania Industrial Co.).

With regard to epoxic resins, for example , the most suitable were found to be the Epikote type (Registered Trade Mark of the Shell Chemical Co.).

As far as high-melting compounds are concerned those based on highly-refined hydrocarbonic waxes and thermoplastic resins, of the type sold under the name of Lunamelt (Registered Trademark for high-melting substances of the Lüneburger Wachsbleiche GmbH) were found to contribute favourably to the optimization of the characteristics of plasticity and adherence of the compounds based on styrene and/or terpene binders but they can also be used with epox resins.

From the characteristics of the components mentioned above it can be clearly seen that only a very careful selection of these made it possible to achieve a correct balance of the parameters involved in the various compounds thus obtaining thermally transferable coatings having a high level of plasticity and adhesion together with excellent service features i.e. they can be transferred by the combined action of heat and pressure with clear and definite dots without any of the smearing or smudging which normally occur when the thermally transferable coating is too fragile or too adhesive or with a not well-defined softening points.

The examples given below illustrate some of the ways in which the inking compound was obtained without however assuming a limitative character on the same.

EXAMPLE 1

170 g of Piccolastic D-75, 30 g of Lunamelt HS-600, 25 g of Raven Carbon Black 1200 (Registered Trade Mark for lampblack produced by the Columbian Carbon Co.), 500 cc of toluene, 300 cc of Methyl isobutylketone and 100 cc of methylethylketone were put into a 1750 cc steel jar. The mixture was ground for 48 hours then filtered and laid on a film of Hostophan 8 $\mu$ thick, the thickness of the coating applied being equal to 2–4 $\mu$. After drying out, the resulting thermally transferable ribbon was found to have a softening point around 60° C and when used on the type of printer described above, when subjected to thermal transfer, produced well-defined black dots which stood out very well without any smearing or smudging.

EXAMPLE 2

175 g of Piccolastic D-75, 25 g of Piccolastic AL (Registered Trade Mark for a styrene resin liquid at room temperature and with a plastifying effect produced by the Pennsylvania Industrial Co.), 25 g of Raven Carbon Black 1200, 500 cc of toluene, 300 cc of methylisobutylketone and 100 cc of methylethylketone.

After being ground for 48 hours, the mixture was filtered and laid upon a film of Hostophan 8 thick. The practical results of the end product were good, the coating having a softening point of 60° C.

EXAMPLE 3

The same mixture as above was used and the same method but instead of Raven Black 1200, 50 g of Paliogen Blau 6740 Registered Trade Mark for a blue pigment produced by BASF was used obtaining a satisfactory product.

EXAMPLE 4

The same mixture and method as described in example 2 were used using 170 g of Epikote 1000 as binder, obtaining a satisfactory product.

EXAMPLE 5

100 g of Vinoflex MP 400 (Registered Trade Mark for plastifying copolymers of vinylchloride vinylisobutylether produced by BASF), 50 g of Piccolyte S-70 and 50 g of Piccolyte S-55, 25 g of Raven Carbon Black 1200, 750 cc of toluene, 150 cc of methylisobutylketone, 100 cc of methylethylketone, were put into a steel jar.

The mixture was ground for 48 hours then filtered and laid on a film of 8 $\mu$ thick Hostophan. After drying out, the resulting thermally transferable ribbon proved to have a softening point of approx. 80° C and using thermal transfer produced well-defined black dots which stood out very well.

The heat sensitive ribbon produced in this way can be used only once and can be used to establish a documentation, at the origin, of the thermally transferred text which can be checked visibly by holding it up to a light or which can be reproduced as a photographic negative or using other systems known to the art.

For particular uses the ribbon can also be produced with a two-coloured coating.

A ribbon of the type described was tried on a conventional typewriter, in which the typing pressure per character is about 10 kg., and no sign was left on the paper.

Vice versa, the ribbon 83, used on printer described above with the service temperature of the heating elements between 120° and 180° with corresponding softening temperatures of the coating between 65° and 70° and with spring 99 exerting a pressure-force between 250 g and 1.2 Kg gave satisfactory results, transferring the text clearly and completely without any smearing or smudging at a writing speed of a maximum of 40 char/-sec.

As has already been remarked, the shape of the heating elements conditions the quality of the transfer of the coating mainly onto normal paper.

In fact, the surface of the coatings of material facing the display medium is normally very smooth mainly because of the materials of which it is made and also because of the coating operation.

Vice versa, the display medium consisting of normal paper has an irregular rough surface. It is therefore necessary to ensure that when the coating is being thermally transferred onto normal paper, there is close contact between the surface of the coating and the paper itself in order to overcome this roughness.

This is done by exerting a suitable pressure on the rear of the tape but the shape and size of the surface exerting this pressure is also important; if it is flat and fairly wide as for example the heating elements of a printhead which has as many heating elements as there are dots of the format matrix and which is stationary with regard to the tape and the paper during each printing operation (considering a format matrix as being made up of 7 rows of 5 dots each, the characters being 2 mm wide and 2.5 mm high, these heating elements are normally square-shaped with a side = 0.3 mm = 300 $\mu$ ; in this case it will be very difficult to obtain close contact between the thermally transferable coating and the paper over all the surface which is exerting the pressure even exerting considerable pressure: this contact will only be ensured on the crests of the rough area and the coating will be transferred only at this point with a consequent loss of clarity and contrast of the printed dot and of the printed character.

Figure 6:
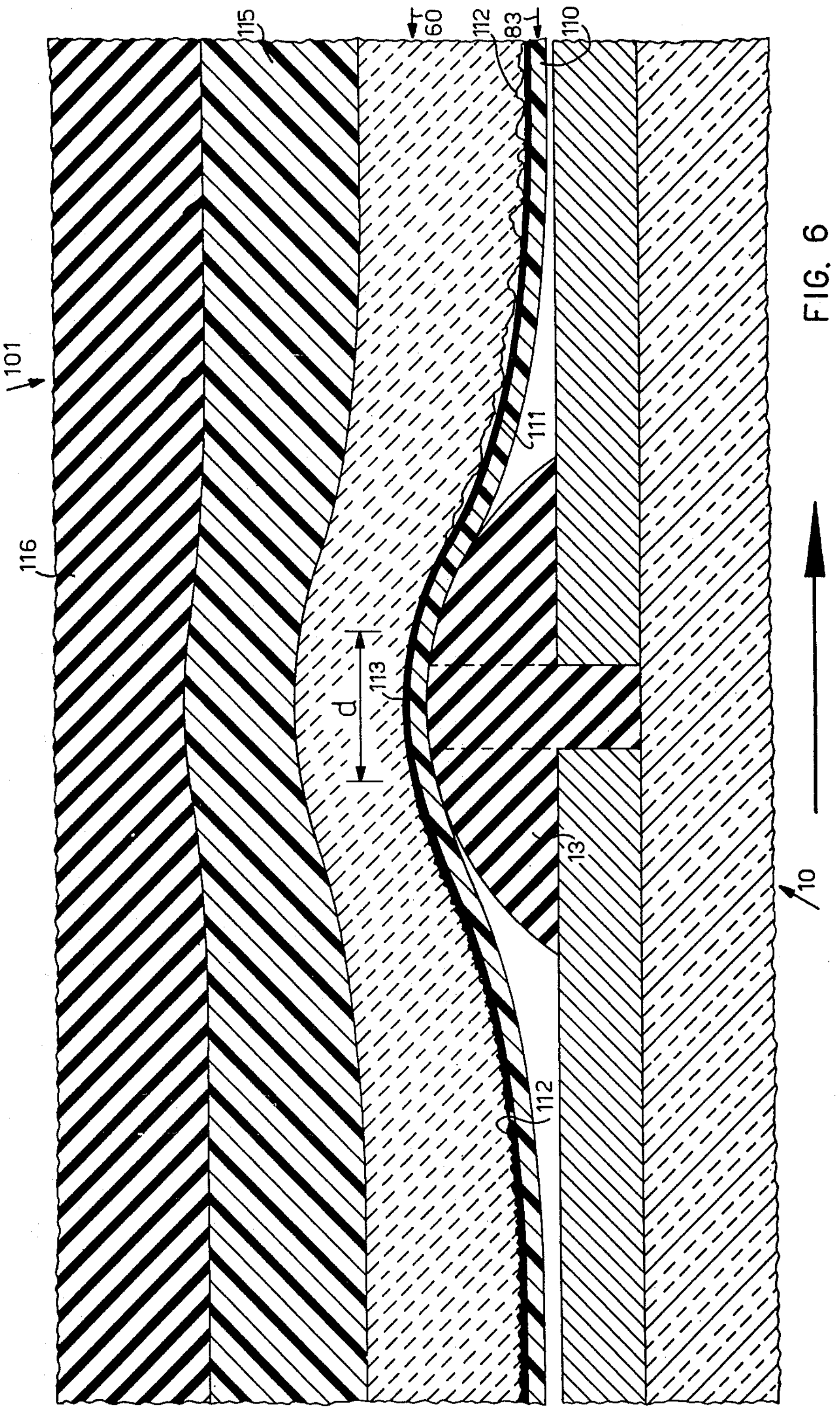
FIG. 6 is an enlarged detail section of the printhead of FIG. 2 of the heat transferable inking element according to the invention and of the display medium.

FIG. 6 represents an enlarged view of column of heating elements 13 of the printhead 10, in accordance with the invention positioned during the writing against the support 110 of ribbon 83, in accordance with the invention, with the thermally transferable inking layer 111 in contact with the surface 113 of the display medium 60 which presents a roughness 112.

The display medium 60 is resting against the elastic-plastic layer 101 of the platen 80 i.e. a layer of plastic material 115 as for example polyvinyl chloride and an underlayer of hard rubber 116.

The pressure exerted by spring 99 on printhead 10 makes it possible for the column of heating elements 13, to "dimple" tape 83 and display medium 60 in contact area "*d*" and to force together the thermally transferable coating 112 and display medium 60 in the said area, aided by the elastic-plastic flexibility of the platen 80 and to flatten out the area of roughness 112 in the area *d*.

If heating element 13 is heated to a temperature such that the corresponding coating 111 melts in this area, coating 111 will stick to surface 113 and therefore tape

83 and display medium 60 will be in contact at these points.

The movement of the printhead 10 will cause these dimples to move to the next pressure points of the printhead thus "ironing" out the roughness 112 and ensuring there is a good contact for the entire width of the dot printed.

The separation of tape 83 and display medium 60, at the end of the printing of a line when the coating 111 sets, again leaves those parts of the coating which were previously softened and sticking to display medium 60 on the display medium itself 60 thus producing the required printing.

For a good quality of the printing it is necessary that the layer 101 does not produce a localized reaction, to the pressure of each heating element 13., which is purely elastic and proportional to the local penetration of each heating element; it is also necessary that the penetration of each heating element does not condition the penetration of the heating element next to it on the column as a result of the flexibility of the layer 101 and that the reaction is practically constant even for different penetrations.

From this point of view, the layer of plastic material 115 for example of polyvinyl chloride with an underlayer 116 of hard rubber, gave satisfactory results insofar as it presented a considerable elastic hysteresis and therefore the springing back takes longer than the time that the pressure is exerted on the printhead.

It is thus submitted how the combination of a printhead of the type described with a thermally transferable tape having the above-mentioned characteristics made it possible to obtain an electrothermal printing unit for printing on a display medium preferably consisting of non-sensitive paper with the printhead moving along the printing line during the act of printing, without any of the disadvantages of smearing or smudging.

It is understood that variations, additions, improvements may be carried out to the machine described here without departing from the scope of the claimed invention.

What we claim is:

1. A thermal printing unit for printing dot-matrix characters on a printing line of a display medium, comprising in combination:

a movable thermal print head having a planar surface and a column of resistive printing elements disposed onto said planar surface transversely to the printing line and selectively electrically heatable in timed relation with the movement of the head, each of said printing elements having a partially cylindrical outer surface concave towards said planar surface, the generatrices of the partially cylindrical outer surface of all the elements being parallel to a common direction transverse to the printing line of the display medium;

means mounting the printing head for continuous movement along the printing line during the printing of a line and for movement towards the display medium in response to pressure applied thereto;

a plastic support material disposed between the printing elements and the display medium;

a coating of material superposed on said support material adjacent to the display medium and transferrable to the display medium in response to a given combination of pressure and heat; and means acting upon said head for pressing said elements against said support material and said coating against said medium during the movement of the head along the printing line during the printing of a line.

2. A thermal printing unit according to claim 1 further comprising a platen upon which the display medium is positioned and having a first layer of elastic material thereon and a second layer of plastic material covering said first layer and in contact with the display medium.

3. A thermal printing unit according to claim 1, wherein said display medium is plain paper.

4. A thermal printing unit according to claim 1 wherein said support plastic material has a thickness comprised between 7 and 20 $\mu$ and said coating has a thickness comprised between 2 and 4 $\mu$ and comprises as essential components a thermoplastic resin, a plasticizer, a pigment and/or a dye.

5. A thermal printing unit according to claim 4, wherein said support material is a terephthalate.

6. A thermal printing unit according to claim 4 wherein said support material is polyethylene.

7. A thermal printing unit according to claim 4 wherein said resin is a styrene resin.

8. A thermal printing unit according to claim 4 wherein said resin is a therpene resin.

9. A thermal printing unit according to claim 4 wherein said resin is an epox resin.

* * * * *